(No Model.) 5 Sheets—Sheet 1.

E. M. BOYNTON.
BICYCLE ELECTRIC CAR.

No. 474,331. Patented May 3, 1892.

WITNESSES:

INVENTOR (No Model.)

5 Sheets—Sheet 2.

E. M. BOYNTON.
BICYCLE ELECTRIC CAR.

No. 474,331. Patented May 3, 1892.

WITNESSES:
D. C. Reusch.
W. H. Boynton.

INVENTOR
Eben Moody Boynton (No Model.) 5 Sheets—Sheet 3.

E. M. BOYNTON.
BICYCLE ELECTRIC CAR.

No. 474,331. Patented May 3, 1892.

WITNESSES:
D. C. Reusch
W. H. Boynton

INVENTOR
Eben Moody Boynton (No Model.)  5 Sheets—Sheet 4.

E. M. BOYNTON.
BICYCLE ELECTRIC CAR.

No. 474,331. Patented May 3, 1892.

WITNESSES: INVENTOR

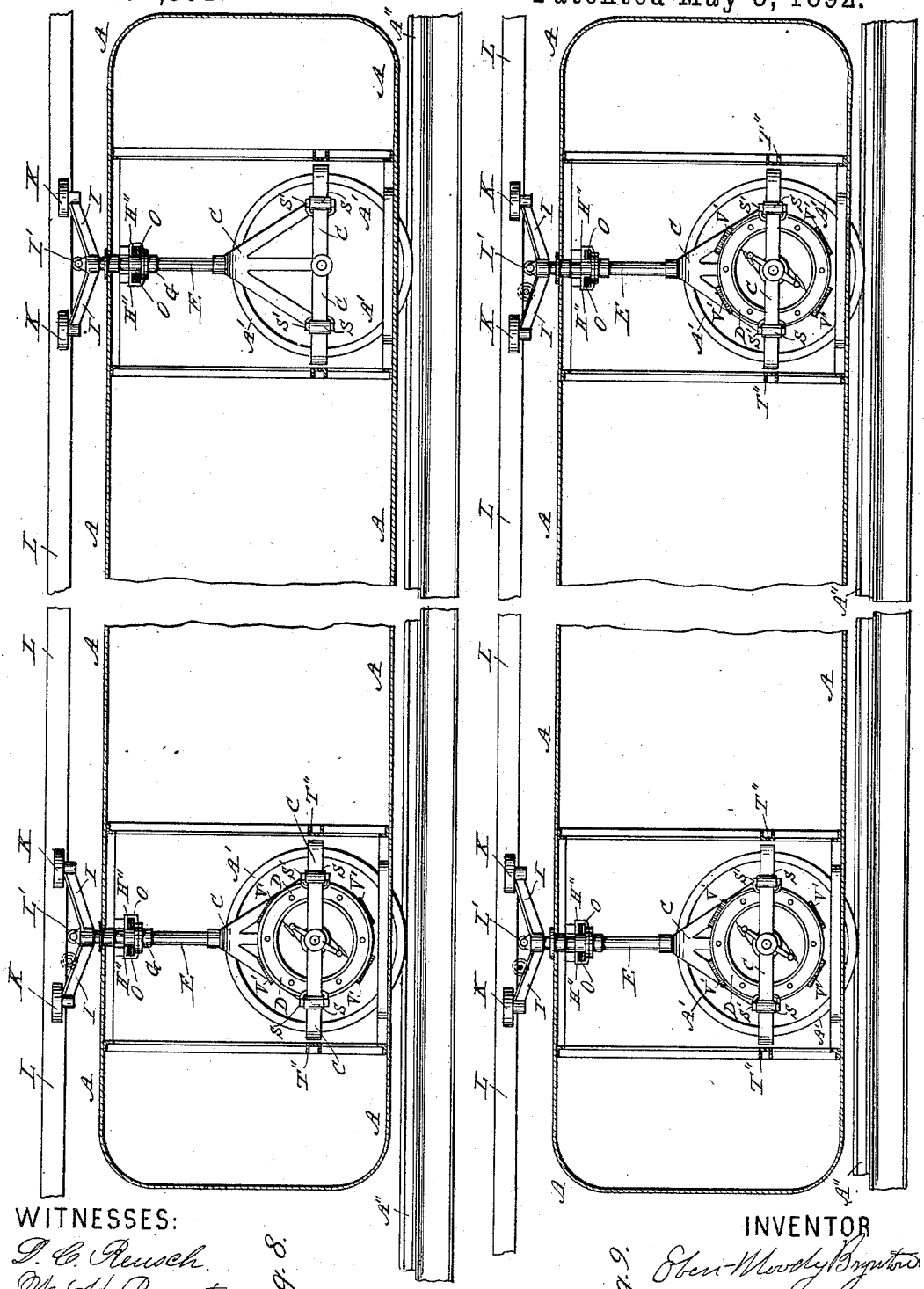

UNITED STATES PATENT OFFICE.

EBEN-MOODY BOYNTON, OF WEST NEWBURY, MASSACHUSETTS.

BICYCLE ELECTRIC CAR.

SPECIFICATION forming part of Letters Patent No. 474,331, dated May 3, 1892.

Application filed April 20, 1891. Serial No. 389,564. (No model.)

*To all whom it may concern:*

Be it known that I, EBEN MOODY BOYNTON, of West Newbury, county of Essex, and State of Massachusetts, have invented certain new and useful Improvements in Electric Motors for Bicycle-Cars, of which the following is a full and clear description.

My invention relates to the use of electric motors in combination with my bicycle-cars and means for connecting such motors with the driving-wheels and the overhead guide-wheels.

The main object of my invention is to so suspend the car from the motor that it is entirely independent of the same, permitting the latter to perform the slight undulations inseparable from running on any kind of road without compelling the car to partake in the same.

A further advantage claimed is the possibility for each driving-wheel to place its axis normal to the rail, no matter if running on a tangent or on a curve, thus permitting an easy running on the latter without any unnecessary friction between the wheel and rail and also without danger of the wheels climbing the same.

Reference is to be had to the accompanying drawings, forming part of this specification, in which similar letters of reference indicate corresponding parts in all the figures.

Figure 1:
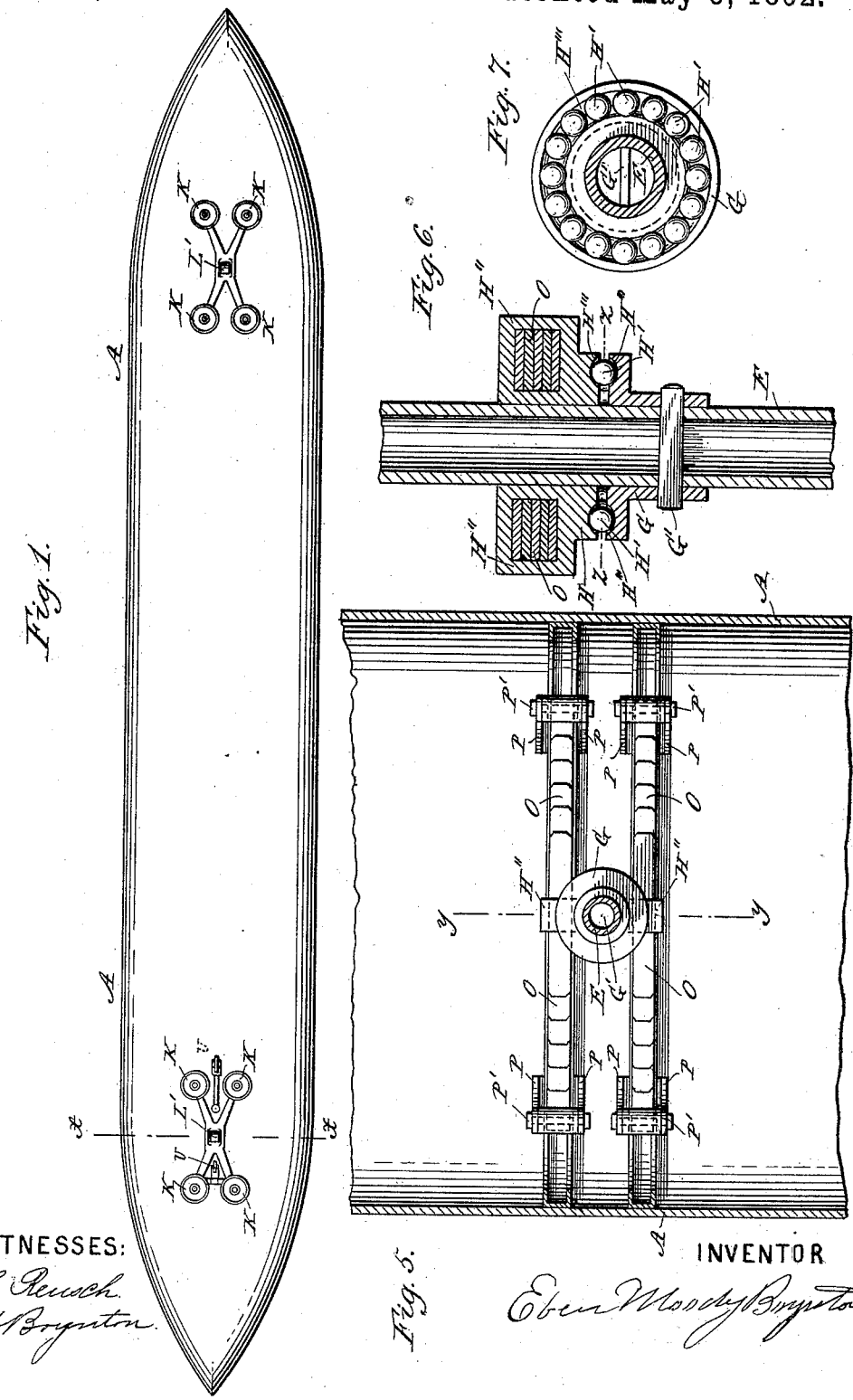
Figure 2:
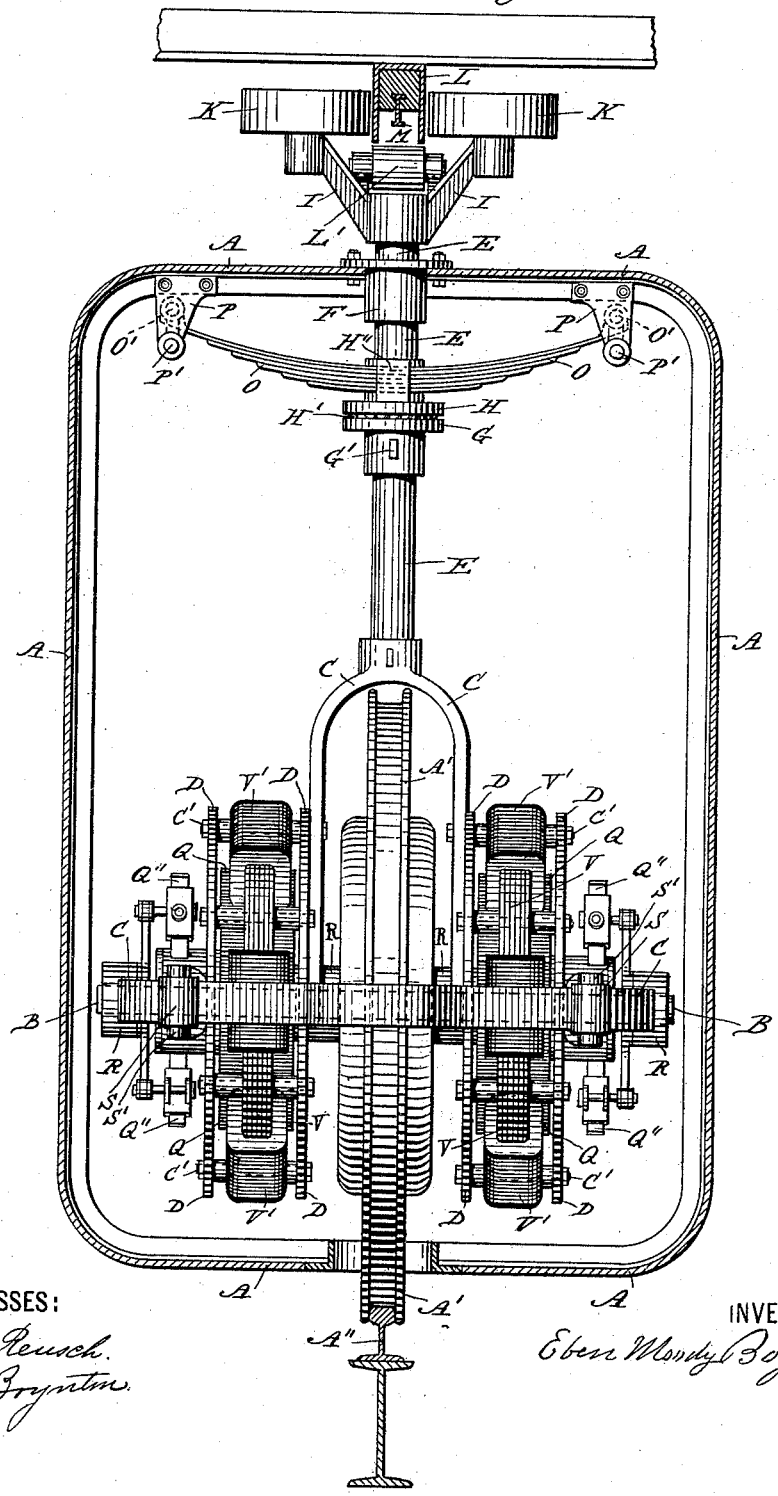
Figure 3:
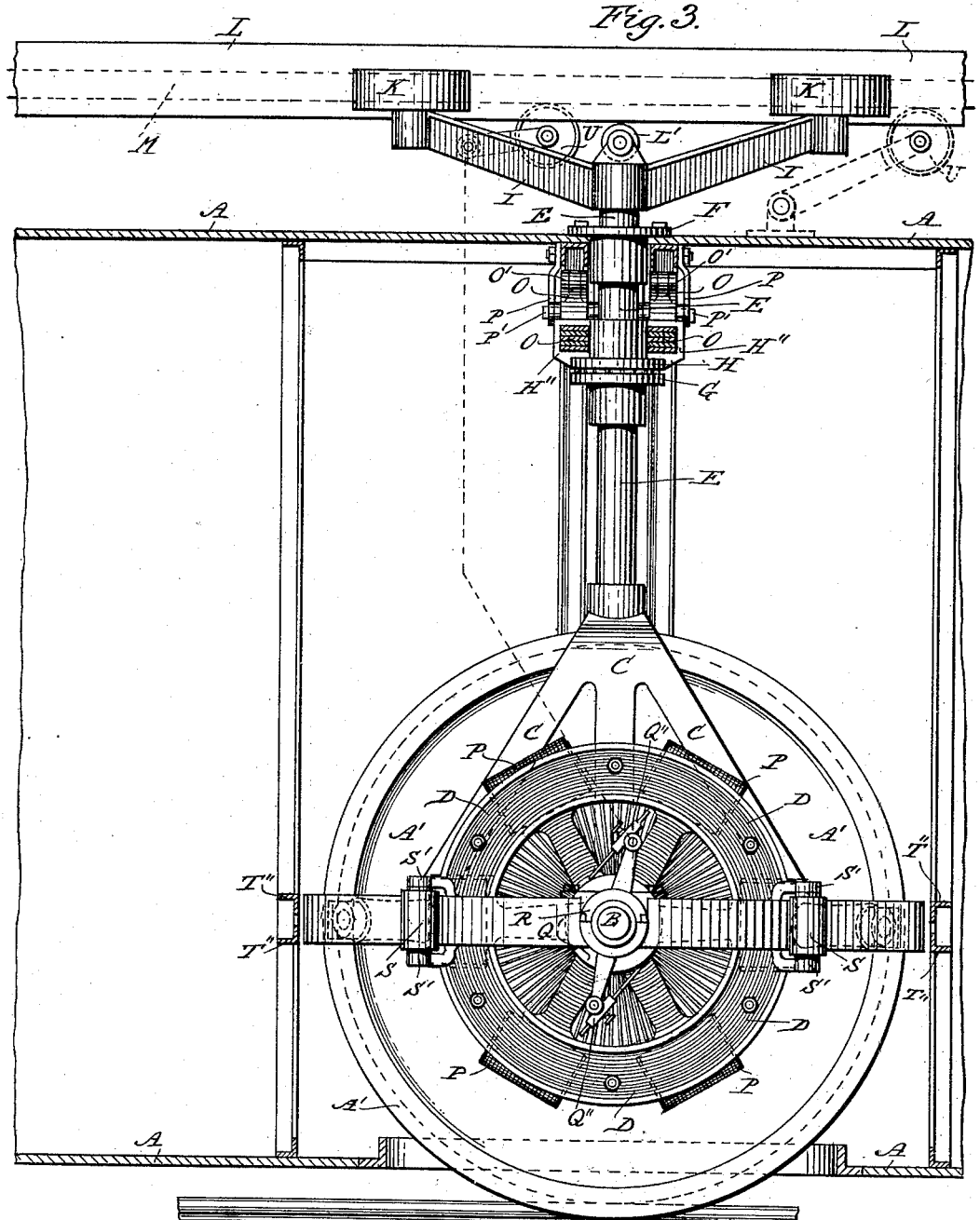
Figure 4:
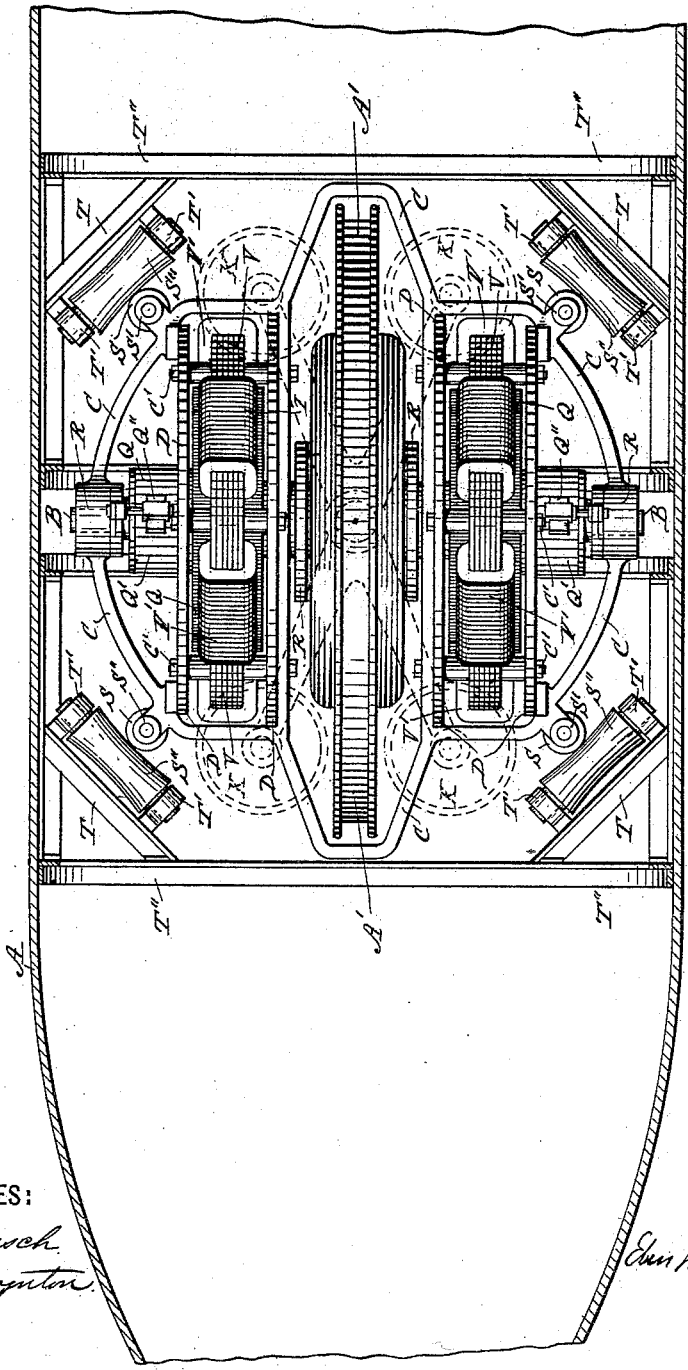

Figure 1 is a plan view of the car, showing the top guide-wheels. Fig. 2 is an enlarged section of the same, taken on line X X. Fig. 3 is a side elevation of the motor and support, partly broken away. Fig. 4 is an inverted plan view of the motor with the bottom of the car broken away. Fig. 5 is an inverted plan view of the supporting-springs. Fig. 6 is a sectional elevation of the supporting-column, showing the ball-bearing. Fig. 7 is a plan view of one of the ball-bearing plates with a section through E, taken on line Z Z, Fig. 6. Fig. 8 is an elevation of a car, partly in section, showing one driving-wheel. Fig. 9 is the same with the difference that both wheels act as driving-wheels.

In the drawings, A A represent the body of the car; A', the driving-wheel that runs on the rail A'' and is fastened on the shaft B B, the latter revolving in the bearings R R and carrying the frame-work C C.

To C C are fastened by the bolts C' the frames D D of the two motors. The armatures Q Q and commutators Q' Q' are also fastened on the shaft B B.

Q'' Q'' are the brushes.

V V are the field-magnets, and V' V' the field-magnet coils.

The frame C C is rigidly connected with and supports the solid or hollow column E, to which the guide-arms I I and guide-wheels K K are fastened. This column E also carries a hub or flange G, held in position by key G'. On this flange rests another and similar one H, but loose, permitting it to revolve around E, and to lessen the friction between these two flanges balls H' are inserted between them, as shown in detail in Figs. 6 and 7. To keep these balls in position the flanges G and H are provided with grooves H''' H'''. Springs O O at their middle, supported by ears H'' H'' on H and having their ends fastened on links O' O', transfer the weight of the car to the column E and to the driving-wheel A'. The links O' O' are inserted between and pivoted to brackets P P by bolts P' P', and these brackets are fastened to the car itself. A bearing F is inserted in the top of the car to keep the column in position and to insure an easy turning of the same. The trolley-wheel U transfers the current from the conductor M down to the motor and from the latter to the supporting-rail A'' in the usual manner. This trolley-wheel can either, as shown, be supported by the arms I I, and thus partake in the movement of the latter, always insuring a central position, or, as shown in dotted lines in Fig. 3, be supported by a separate arm and be independent in its movements. A roller L', fastened on the top of the column, has the object to prevent too large undulations in a vertical direction of the driving-wheel and column, thus insuring a constant distance between the rail A'' and the rollers K K and also preventing the driving-wheel from leaving the rail. As the guide-wheels K K embrace the guide-beam L on both sides, it compels the axis of the driving-wheel to take a position normal to the rail as well when running on a tangent as on a curve, thus preventing any climbing of the rail and any grinding between the flanges of the driving-wheel and the rail A'', reducing the extra friction in rounding curves to a minimum.

When the car is running on a tangent and is entering a curve, the guide-wheels K K leave their middle position and move toward one or the other side of the car, depending as to which side the curve turns, thus imparting part of a revolution to the column E, and as driving-shaft, motors, and driving-wheel all are rigidly connected with E the latter transfers this movement to the driving-wheel A'.

As Figs. 2, 5, and 6 illustrate, the turning of the column does not interfere with the movement of the car, as the springs O O and the hub H in which they rest are not fastened to the column, but permit the latter to revolve loosely in said hub.

Fig. 4 illustrates the method by which the forward pull or pressure of the driving-wheel is transferred to the body of the car, resulting in the forward motion of the latter. The vertical rollers S S, journaled in the arms S' S', fastened to the frame C, are in contact with other rollers S'' S'', mounted in a horizontal position in the bearings T' T', the latter being bolted to the braces T T, fastened to the beams T'' T''. These rollers S'' S'' are not cylindrical, as their sides, instead of being straight lines, are arcs of a circle, with the center in the axis of the column E, the object being to insure a constant contact between the rollers S' and S'' when the former move to one side or the other. Both rollers S S and S'' S'' may be mounted in such a manner that the distance of their axes from the center of the column E may be regulated. This is not illustrated in the drawings, as the same may be done in many different ways. The combination of these rollers will permit an easy up-and-down motion of the motor without compelling the car to partake in the same, suspended, as it is, only from the springs O O, with no positive connection with the running-gear whatever. This independence of the motor permits also, as shown above, almost any angular position that the driving-wheel may take in relation to the car, thus permitting the car to run around the sharpest curves without any difficulty.

The motors may, as illustrated in Fig. 8, only be applied to one of the driving-wheels and the other wheel run idle simply as a support; or, if desirable, the latter may also, as illustrated in Fig. 9, be supplied with motors, and thus assist in the propelling of the car.

It is obvious that the special features of this invention may in many ways be varied without changing the leading idea of the same.

Having thus described my invention, I claim as new and desire to secure by Letters Patent—

1. In a railroad-car, the combination, with the car-body, of a frame fastened to same, extending vertically therethrough and revoluble about a vertical axis, a supporting-wheel at the base of such frame, and lateral supporting-wheels in the frame above the car-body, substantially as set forth.

2. In a railroad-car, the combination, with the car-body, of a frame fastened to same, extending vertically therethrough and revoluble about a vertical axis, said frame supporting the top of the car by means of springs, a supporting-wheel at the base of such frame, and lateral supporting-wheels in the frame above the car-body, substantially as set forth.

3. In a railroad-car, the combination, with the car-body, of a frame fastened to same, revoluble about a vertical axis and arranged to be capable of movement in a vertical direction independent of the car-body, a column fastened to said frame and laterally supported in a bearing in the roof of the car, the top of the column being provided with arms carrying guide-wheels suited to embrace the top guide-rail, a shaft journaled in said frame, and a supporting-wheel mounted on the shaft, substantially as set forth.

4. In a railroad-car, the combination, with the car-body, of a frame fastened to same, revoluble about a vertical axis and arranged to be capable of movement in a vertical direction independent of the car-body, a column fastened to said frame and laterally supported in the roof of the car, the top of the column being provided with arms carrying guide-wheels suited to embrace the top guide-rail, means for securing the central position of the frame, a shaft journaled in said frame, and a supporting-wheel mounted on the shaft, substantially as set forth.

5. In a railroad-car, the combination, with the car-body, of a frame fastened to same, revoluble about a vertical axis and arranged to be capable of movement in a vertical direction independent of the car-body, a column fastened to said frame and laterally supported in a bearing in the roof of the car, the top of the column being provided with arms carrying guide-wheels suited to embrace the top guide-rail, springs transferring the weight of the car to a hub loosely mounted on the column, means for supporting the hub and means for securing the central position of the frame, a shaft journaled in said frame, and a supporting-wheel mounted on the shaft, substantially as set forth.

6. In a railroad-car, the combination, with the car-body, of a frame fastened to same near one end thereof and revoluble about a vertical axis and arranged to be capable of movement in a vertical direction independent of the car-body, electric motor field-magnets fastened to the frame, a shaft journaled in same, and a driving-wheel and armatures mounted on the shaft, the armatures to be acted on by said field-magnets and said wheel forming the support for that end of the car, substantially as set forth.

7. In a railroad-car, the combination, with the car-body, of a frame fastened to same, revoluble about a vertical axis and arranged to be capable of movement in a vertical direction independent of the car-body, a column fastened to said frame and laterally supported in a bearing in the roof of the car, electric-motor field-magnets fastened to the frame, a shaft journaled in same, and a driving-wheel and armatures mounted on the shaft, the armatures to be acted on by said field-magnets, substantially as set forth.

8. In a railroad-car, the combination, with the car-body, of a frame fastened to same, revoluble about a vertical axis and arranged to be capable of movement in a vertical direction independent of the car-body, a column fastened to said frame and laterally supported in a bearing in the roof of the car, the top of the column being provided with arms carrying guide-wheels suited to embrace the top guide-rail, electric-motor field-magnets fastened to the frame, a shaft journaled in same, and a driving-wheel and armatures mounted on the shaft, the armatures to be acted on by said field-magnets, substantially as set forth.

9. In a railroad-car, the combination, with the car-body, of a frame fastened to same, revoluble about a vertical axis and arranged to be capable of movement in a vertical direction independent of the car-body, a column fastened to said frame and laterally supported in a bearing in the roof of the car, the top of the column being provided with arms carrying guide-wheels suited to embrace the top guide-rail, means for securing the central position of the frame, electric-motor field-magnets fastened to the frame, a shaft journaled in the same, and a driving-wheel and armatures mounted on the shaft, the armatures to be acted on by said field-magnets, substantially as set forth.

10. In a railroad-car, the combination, with the car-body, of a frame fastened to the same, revoluble about a vertical axis and arranged to be capable of movement in a vertical direction independent of the car-body, a column fastened to said frame and laterally supported in a bearing in the roof of the car, the top of the column being provided with arms carrying guide-wheels suited to embrace the top guide-rail, springs transferring the weight of the car to a hub loosely mounted on the column, means for supporting the hub and means for securing the central position of the frame, electric-motor field-magnets fastened to it, a shaft journaled in same, and a driving-wheel and armatures mounted on the shaft, the armatures to be acted on by said field-magnets, substantially as set forth.

11. In a railroad-car, the combination, with the car-body, of two frames fastened to same, one in each end of the car, both extending vertically therethrough and revoluble about vertical axes, a supporting-wheel at the base of one of said frames, electric-motor field-magnets fastened to the other frame, the latter having a shaft journaled in it, and a driving-wheel and armatures mounted on the shaft, the armatures to be acted on by said field-magnets, each of said frames also being provided with lateral supporting-wheels above the car-body, substantially as set forth.

12. In a railroad-car, the combination, with the car-body, of two frames fastened to same, one in each end of the car, both extending vertically therethrough and revoluble about vertical axes, electric-motor field-magnets fastened to each frame, the latter having a shaft journaled in each of them, and a driving-wheel and armatures mounted on each shaft, the armatures to be acted on by said field-magnets, each frame also being provided with lateral supporting-wheels above the car-body, substantially as set forth.

Signed at New York, in the county of New York and State of New York, this 16th day of April, A. D. 1891.

EBEN MOODY BOYNTON.

Witnesses:
D. C. REUSCH,
C. N. CALDWELL.